April 29, 1930. O. L. BOOSINGER 1,756,724
BATTERY TERMINAL
Filed Oct. 13, 1927
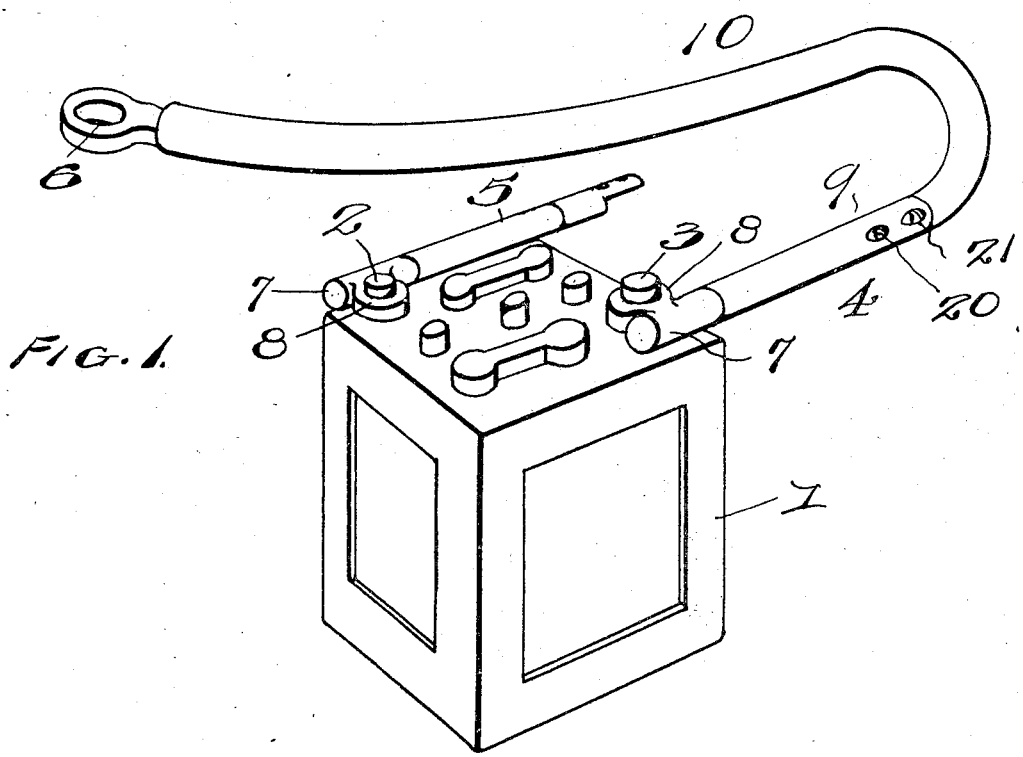
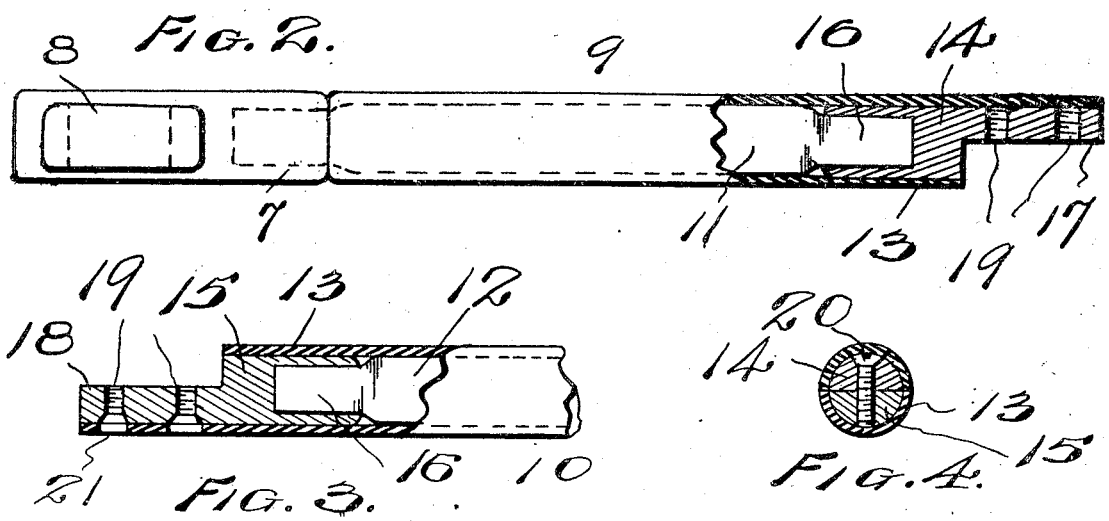
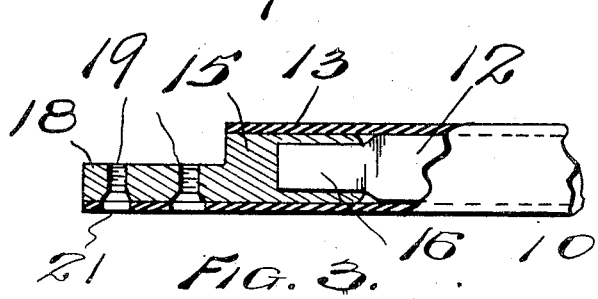
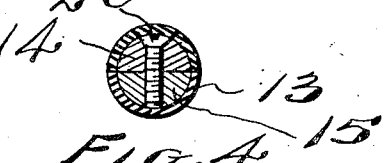
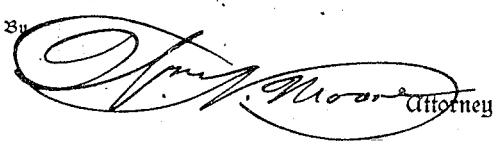
Inventor
O. L. BOOSINGER
By
Attorney Patented Apr. 29, 1930

1,756,724

UNITED STATES PATENT OFFICE

OSWELL L. BOOSINGER, OF INDEPENDENCE, KANSAS

BATTERY TERMINAL

Application filed October 13, 1927. Serial No. 225,933.

My present invention relates to improvements in battery terminals for use with batteries employed upon automotive vehicles for ignition, starting and illuminating purposes, to insure a quick detachable connection for the starter and ground cables.

The terminals may with facility be installed or attached to the posts of a battery of the type usually employed on automotive vehicles at comparatively low cost, by welding or soldering the lead terminals to the battery posts. The permanently welded or soldered joint between the cable and post insures a perfect connection, which is free from corrosion, and therefore the difficulties encountered from corrosion in the usual frictional-contact joints are eliminated.

The terminals may with convenience be disconnected when removal of the battery is required, as for the purpose of recharging the battery, and the recharged battery may be with equal convenience connected with the cables after being replaced in proper position.

The cables are made up of sections, one of which is permanently attached to a battery post and the other section is connected to the starter or grounded as the case may be, and a split, detachable connection is made between the cable sections as will be hereinafter pointed out. In the accompanying drawings I have illustrated one complete example of the physical embodiment of my invention wherein the parts are combined and arranged according to the best mode I have thus far devised for the practical application of the principles of my invention.

Figure 1 is a perspective view showing a battery with a cable-connection or conductor attached thereto, and showing also a section of another connection attached, as by welding or soldering, to the post.

Figure 2 is a detail view, partly broken away for convenience of illustration, showing one of the cable sections that is permanently attached to a battery post.

Figure 3 is a sectional view of a part of the complementary section that is coupled with the section of Figure 2.

Figure 4 is a transverse sectional view through the coupling between the terminal-coupling.

In order that the general arrangement and relation of parts may readily be understood I have shown in Figure 1 a typical battery as 1 with the usual posts 2 and 3 to which the conductors or connections, indicated as a whole, by the numerals 4 and 5, are connected. One of the rings as 6 is shown at the end of the conductor 4, said ring being used for attachment to the starter, or used as a ground connection on a part of the vehicle.

The terminal head 7 is fashioned with a ring 8 and this ring is soldered or welded over the battery post to form a permanent attachment, for the section 9 of the conductor, to the battery, and this joint it will be apparent provides an efficient and perfect electrical connection to the post.

The other, longer section 10 of the conductor may also be permanently connected or attached to the starter, or secured by a nut on a bolt of the motor or engine, for a ground.

The cable-sections are designated as 11 and 12, the former forming part of the short conductor-section and the latter being a part of the longer conductor-section 10. Both sections of the cable are enclosed within the insulating sleeve or covering 13.

Between the conductor sections is interposed a split coupling which comprises a pair of complementary sleeves 14 and 15 in which the cable ends are clamped or soldered as at 16. The sleeves are fashioned with integral tongues 17 and 18 that are adapted to overlap and be joined together to form the detachable coupling or split coupling between the conductor sections. The overlapping tongues are fashioned with registering screw holes 19 for the pair of screws 20 that rigidly secure the tongues and their sleeves together, and if desired, holes 21 may be provided in the insulating covering to permit access of a screw driver when applied to the screws.

It will be apparent that when the battery is to be removed, as for recharging, the screws 20 are removed to permit ready disconnection between the overlapping tongues of the coupling members, and after the sleeves are disconnected the battery may be removed. The shorter sections 4 of the conductors remain attached to the battery and the longer sections 10 remain attached, as by rings 6 to either the ground point or to the starter. After the battery has been replaced, the coupling members are secured together by means of the screws, and the battery is ready for use.

It will be noted that the battery terminal according to my invention comprises the terminal head, the cable section and the conductor member, and that these elements are of uniform shape and size throughout, and that the cable section and conductor member are entirely covered and protected by an insulating covering, which are important in that no metal surfaces are exposed to outside contact which would interfere with the proper functioning of the device as well as insuring a more desirable device of this character.

Having thus fully described my invention, what I claim as new and desire to secure by Letters Patent is:—

A battery terminal as herein shown and described, comprising a terminal head provided with a ring for connection with a battery post and having a socket in one end, a cable section having a reduced end to snugly fit said socket of the terminal head and having a similar reduced opposite end, a sleeve having a socket similar in size and shape to the socket of the terminal head to receive the other reduced end of said cable section, said sleeve being formed with a tongue of semi-circular form in outline, a conductor member having a tongue of semi-circular form in outline to make a joint with the similar tongue of the sleeve, fastening means passing through said tongues to form a circular joint, and insulating sleeves covering said cable section and conductor member entirely to protect and cover all metal surfaces and to form an insulating covering of uniform size and shape throughout.

In testimony whereof I hereunto affix my signature.

OSWELL L. BOOSINGER.